UNITED STATES PATENT OFFICE.

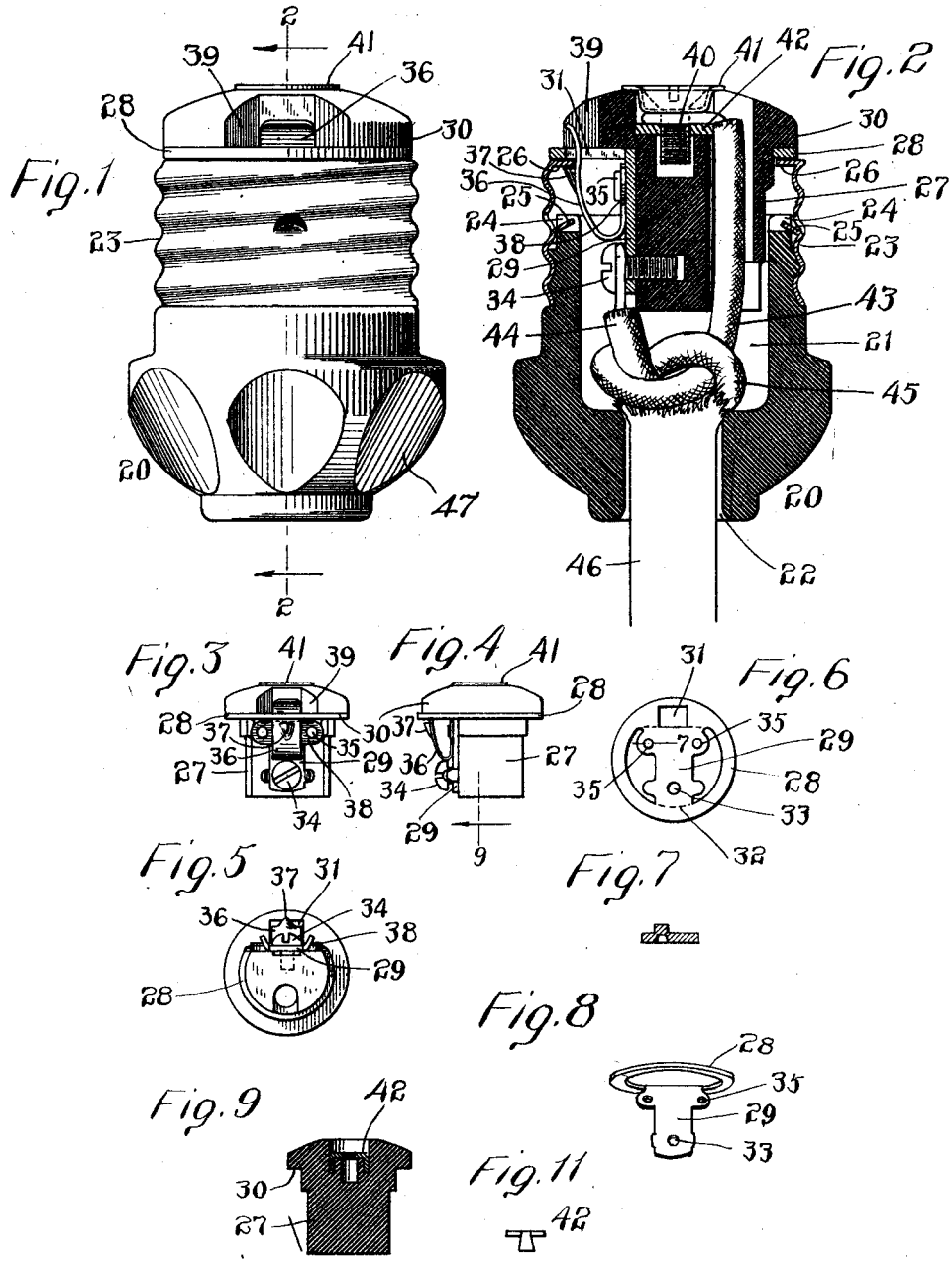

CLARENCE D. PLATT, OF BRIDGEPORT, CONNECTICUT.

SWIVEL ATTACHMENT-PLUG.

1,110,271.  Specification of Letters Patent.  Patented Sept. 8, 1914.

Application filed February 26, 1914. Serial No. 821,134.

*To all whom it may concern:*

Be it known that I, CLARENCE D. PLATT, a citizen of the United States, residing at Bridgeport, county of Fairfield, State of Connecticut, have invented an Improvement in Swivel Attachment-Plug, of which the following is a specification.

This invention has for its object to provide a swivel attachment plug consisting of two members only, which shall be simple and inexpensive to produce, safe and certain in operation, of small size, with few parts and no loose parts to become separated, only two screws being used and those being the necessary binding screws, and the members being locked together in any relative position when in alinement by an endwise movement.

A further object of the invention is to provide a two-member plug having means for separating the members without the use of tools by a simple pressure of thumb and finger.

With these and other objects in view I have devised the novel two-member swivel attachment plug which I will now describe, referring to the accompanying drawing forming a part of this specification and using reference characters to indicate the several parts.

Figure 1 is an elevation on an enlarged scale of my novel attachment plug complete; Fig. 2 a section on the line 2—2 in Fig. 1, looking in the direction of the arrows; Fig. 3 a view of the upper or cap member detached; Fig. 4 an elevation as seen from the right in Fig. 3; Fig. 5 an inverted plan view corresponding with Fig. 3; Fig. 6 a plan view of the contact ring and shell terminal as blanked out; Fig. 7 a detail sectional view on the line indicated by 7 in Fig. 6; Fig. 8 a perspective of the contact ring and shell terminal detached; Fig. 9 a section of the upper or cap member on the line indicated by 9 in Fig. 4; Fig. 10 an inverted plan view of the anchor plate detached, and Fig. 11 is an elevation of the anchor plate detached.

20 denotes the lower or base member which is molded from suitable insulating material, as porcelain or hard rubber, and is provided with a central opening 21, a hole 22 leading into said opening and at its upper end with a thread for engagement by the screw shell. indicated by 23. The member is preferably provided with recesses 24 and the shell is locked to the member by tongues or indentations 25 forced into the recesses after the shell is screwed on tight. The upper end of the screw shell is provided with an inwardly extending annular flange 26 which is an important feature of the invention, as will presently be explained. The upper or cap member comprises a body 27 formed from suitable insulating material, as porcelain or hard rubber, and a contact ring 28 and shell terminal 29 blanked out and formed from sheet metal in one piece, for example substantially as shown in Fig. 6. Body 27 of the cap member passes within the screw shell and the base member and has formed at the upper end thereof a flange 30 under which the contact ring lies. This ring is adapted to engage the flange of the screw shell and is formed with an opening 31 through it and with the shell terminal 29 integral therewith, as clearly shown in Fig. 6. The free end of the shell terminal is detached from the ring at the dotted line indicated by 32, and said terminal is then bent at right angles to the ring, as clearly shown in Fig. 8. The shell terminal is provided with a hole 33 for a binding screw 34 and with lugs 35 punched out therefrom. The members are secured together by means of a locking spring 36 having a catch 37 struck out therefrom which is adapted to engage the under-side of flange 26 on the screw shell in any relative position of the members. The locking spring is provided with an attaching plate 38 having holes through which lugs 35 are passed and the spring is secured to the shell terminal by heading down the lugs, thus doing away with the use of screws or separate rivets. The locking spring is curved downward from the attaching plate, then upward and through opening 31 in the contact ring, the free end of said spring lying in a recess 39 in the flange in the body in a convenient position for manipulation by the operator.

40 denotes the center contact binding screw which is socketed in a cup-shaped washer 41, lying in a recess in the top of body 27, and engages an anchor plate 42 which is molded into the body. 43 denotes an electrical conductor leading to binding screw 40, and 44 an electrical conductor leading to binding screw 34. These conductors are insulated as usual, are tied in an underwriter's knot, indicated by 45, in central opening 21 in the lower member, to prevent strain upon the binding screws, and are ordinarily united in a cable 46 which enters through hole 22 in the lower or base member.

In assembling, the cable is passed through the base member and the screw shell, and the ends of the electrical conductors are connected to the binding screws in the usual manner. The parts are then ready for attachment which is effected by simply pressing the members together endwise, the locking catch passing over flange 26 on the screw shell, in any relative position of the members, and then springing into locking position under said flange, as clearly shown in Fig. 2. I have shown the base member as provided with finger recesses 47 for convenience in operation. I find these recesses an advantage as they enable the operator to take firm hold of the member at the lower end thereof. In making connection with a socket, the attachment plug is screwed to place in the usual manner (the cable being held stationary) which places the center contact screw and washer 41 in engagement with the center contact of the socket, not shown. The contact ring does not normally lie in close engagement with flange 26 on the screw shell. When the attachment plug is turned into a socket, however, the members will be drawn together when the center contacts of the plug upon the socket engage and the contact ring and the flange on the shell will be drawn tightly with a wiping contact. To separate the members it is simply necessary to press inward upon the locking spring and then draw them apart.

Having thus described my invention I claim:

1. An attachment plug of the character described comprising a screw shell having an annular flange, an insulating base having threaded engagement therewith and provided with a recess, said shell and base being permanently secured together by indenting the shell into the recess, and a second member comprising an insulating body, a contact ring and terminal formed integral, a binding screw securing the terminal and ring to the body, and a locking spring secured to the terminal and adapted to engage the flange on the shell to lock the members together.

2. An attachment plug of the character described, comprising a screw shell having an annular flange, an insulating base permanently secured thereto, a second insulating member having an anchor plate molded therein, a binding screw engaging said plate, an integral contact ring and shell terminal, a binding screw securing said terminal and ring to the second member and a locking spring secured to the terminal and adapted to engage the flange on the screw shell.

3. An attachment plug of the character described, comprising a screw shell having an annular flange, an insulating base permanently secured to the shell, a cap member having a flange and a body which passes through the screw shell and into the base member, a contact ring and shell terminal secured to the body and a locking spring secured to said terminal and adapted to engage the flange of the screw shell, the contact ring being forced into wiping contact with the flange on the screw shell by the flange on the cap member when connection is made.

4. A two member swivel attachment plug comprising a screw shell having an annular flange, an insulating base permanently secured thereto, a second insulating member having a flange at its upper end with a finger recess therethrough, and a locking spring attached to said second insulating member and adapted to engage the flange of the screw shell to secure the parts together and extending into the recess for manipulation by the operator.

5. An attachment plug of the character described comprising a screw shell having an annular flange, an insulating base secured thereto, a second insulating member having a recess extending through the top thereof, and a locking spring carried by said second member and curved downward and then upward into the recess and provided with a catch adapted to engage the flange on the screw shell, pressure on the spring acting to unlock the members.

In testimony whereof I affix my signature in presence of two witnesses.

CLARENCE D. PLATT.

Witnesses:
H. W. Meade,
E. M. Culver.